United States Patent [19]

Seelen et al.

[11] 4,095,895

[45] Jun. 20, 1978

[54] METHOD AND MEANS FOR PREVENTING EDGE SHADOW EFFECTS DURING EPISCOPIC EXPOSURE OF AN ORIGINAL

[75] Inventors: Francıscus J. H. M. Seelen; Andreas P. H. M. Timmermans, both of Venlo, Netherlands

[73] Assignee: Oce-van der Grinten N.V., Venlo, Netherlands

[21] Appl. No.: 717,883

[22] Filed: Aug. 26, 1976

[30] Foreign Application Priority Data

Sep. 1, 1975 Netherlands ........................ 7510270

[51] Int. Cl.[2] ...................... G03B 27/32; G03B 27/54; G03B 27/62

[52] U.S. Cl. ........................................ 355/77; 355/67; 355/75

[58] Field of Search .................. 355/67, 70, 77, 7, 16, 355/3 R, 11, 51, 75

[56] References Cited

U.S. PATENT DOCUMENTS

| | | | |
|---|---|---|---|
| 3,395,610 | 8/1968 | Evans et al. | 355/11 |
| 3,671,121 | 6/1972 | Albert | 355/3 R X |
| 3,724,942 | 4/1973 | Gibson et al. | 355/3 R |
| 3,771,082 | 11/1973 | Matsumoto | 355/67 |
| 3,784,301 | 1/1974 | Sato | 355/51 X |
| 3,815,992 | 6/1974 | Ogawa | 355/67 X |
| 3,998,541 | 12/1976 | Michaloski | 355/67 X |

OTHER PUBLICATIONS

I.B.M. Technical Disclosure Bulletin, vol. 15, No. 2, 7/1972, p. 521, Illumination to Eliminate Shadows, Bersot et al.

*Primary Examiner*—Donald A. Griffin
*Attorney, Agent, or Firm*—Albert C. Johnston; Gerard F. Dunne

[57] ABSTRACT

Edge shadow effects on copies obtained by episcopic exposure of an original lying on a transparent exposure plate are prevented by directing light toward at least one side edge of the original from a surface laterally adjacent thereto of a light transmitting means disposed on the exposure plate. Each light transmitting means is constituted by a transparent plate member having its surfaces made diffusely reflecting, except a transparent surface directed toward the original and a transparent surface disposed in a path of illumination from a light source. Such a plate member extending along a margin of the exposure plate in electrophotographic copying apparatus serves the dual function of guiding the laying of an original onto the exposure plate and preventing edge shadow effects which otherwise result from a narrow slit or cavity that usually occurs between an edge of the original and the guide member usually provided on the exposure plate.

8 Claims, 3 Drawing Figures

METHOD AND MEANS FOR PREVENTING EDGE SHADOW EFFECTS DURING EPISCOPIC EXPOSURE OF AN ORIGINAL

This invention relates to a method, and also to electrophotographic copying apparatus, for preventing edge shadow effects during episcopic exposure of an original lying on a transparent plate such as a glass plate.

Methods and means for this purpose have been proposed heretofore. In U.S. Pat. 3,119,301 it is recognized that during episcopic exposure of an original having image parts such as letters or figures adhesively secured to a support and thus rising noticeably above the support suface, shadows are produced along the edges of these image parts because of the height difference between them and the support surface, which shadows manifest themselves on the negative copy as white areas that require retouching by hand. Since retouching is an inconvenient, time-consuming and therefore expensive task, the patent proposes to eliminate the problem by exposing the back of the original to additional light.

While such an additional exposure from the back should indeed be effective when the support of the original is considerably transparent, it affords no remedy for the edge shadow effect in the exposure of opaque originals. Moreover, the troubles arising from edge shadow effects which manifest themselves on the copy are not limited to originals in which there is a height difference between the image surface and the support surface. Objectionable edge shadow effects occur also with almost every copy produced by episcopic exposure, being caused by the raised side edge of the original along its cut borders. The thicker the original, i.e., the higher the raised edge, the stronger is this effect.

In the case of electrophotographic copying by the reflection of light onto a charged photoconductive surface from an original lying on a transparent glass plate, shadow effects from an edge or edges of the original often cause insufficient dissipation of the surface charge in corresponding areas of the photoconductive imaging medium, with resultant development of these areas into more or less wide stripes on the copy. A slit or cavity causing a stripe to be formed on the copy nearly always exists between an edge of the original and a bar or frame member provided to guide the laying of the original onto the glass plate. A cavity giving rise to a stripe formation may also exist, for instance when copying thick originals such as books, between a raised edge of the original and a portion of a reflective flap covering the original.

A method to prevent these edge shadow effects by the use of auxiliary reflectors is proposed in IBM Technical Disclosure Bulletin 15 No. 2 (July 1972) at page 521. In that method the normal exposure is effected via a mirror with light which falls more or less perpendicularly on the original, and the auxiliary reflectors cause some of the light rays to fall more laterally on the original. The use of a reflector with auxiliary reflectors can serve the purpose, however, only if the relevant edge of the original lies free, i.e., is not blocked from the light for instance by a frame or guide member. Accordingly, while that technique may avoid shadow effects from a raised edge opposite a reflective area of a flap covering the original, it does not prevent the shadow effects caused by a raised edge lying beside a guide member, because the laterally incident rays from the latter edge will be blocked by the guide member. In principle, the shadow effects of the latter edge might be eliminated by the method described in U.S. Pat. No. 3,119,301, but that possibility is hardly practicable because it would then be necessary to provide a light source in the covering device for exposing the back of the original, and this would be technically complicated and expensive; also, a long lamp life could not be assured, due to the necessity for frequent raising and lowering of the covering device.

The object of the present invention is to provide a method and means for preventing edge shadow effects, especially those caused by the raised edge (side edge, or bordering cut surface) of an original, which method and means are suitable both for transparent and for opaque originals and are technically simple, inexpensive and long lasting in use.

According to the invention, during episcopic exposure of an original lying on a transparent plate at least one of the side edges of the original is subjected to an extra exposure to light directed toward such edge from a location on the transparent plate, so that shadow effects from the edge or edges so exposed are prevented. For this purpose, means for directing light to one or more side edges of the original are provided on the transparent exposure plate, substantially in the plane occupied by the original laid thereon.

The means for effecting the extra exposure preferably comprise one or more transparent plates each of which is positioned on the transparent exposure plate and has all its surfaces made diffusely reflecting except a surface directed toward the original and a surface in the path of light from a source of illumination. Such a transparent plate may be, for instance, a narrow plate provided in the cavity between an edge of the original and a covering flap and having a thickness about equal to the thickness of the original, by which plate a portion of the light which otherwise penetrates into that cavity at various angles and becomes largely lost there (for instance, due to absorption by the flap) will now be radiated outward in greater part at the side of this plate and so concentrated in the direction of the original.

A similar narrow transparent plate may also be provided for the cavity or slit at the edge of the original next to a guide member provided for guiding the laying of the original onto the glass exposure plate. However, the best remedy for this cavity or slit is obtained by making the guide member itself as a transparent plate having diffusely reflecting surfaces except at a lower side thereof lying in the said light path and along its side edge directed toward the original, where the surfaces are kept transparent.

In certain circumstances it may occur that the slit or cavity next to an edge of the original does not receive any light at all by the normal exposure. In such case of course the means according to the invention effects the only, or primary, exposure of the edge concerned, so not strictly an "extra" exposure. In most cases, however, some light of the normal exposure will surely penetrate into the slit or cavity, so that an extra or supplemental exposure is indeed effected by the light directed into the slit or cavity by the means provided according to the invention. The term "extra exposure" as used herein refers to any of these cases, with the understanding that it also relates to the case in which the "extra " exposure is the primary or only exposure of the edge concerned.

The invention will be further understood, and other objects, features and advantages thereof will be evident from the following description, in which reference is made to the accompanying drawing. In the drawings.

Figure 1:
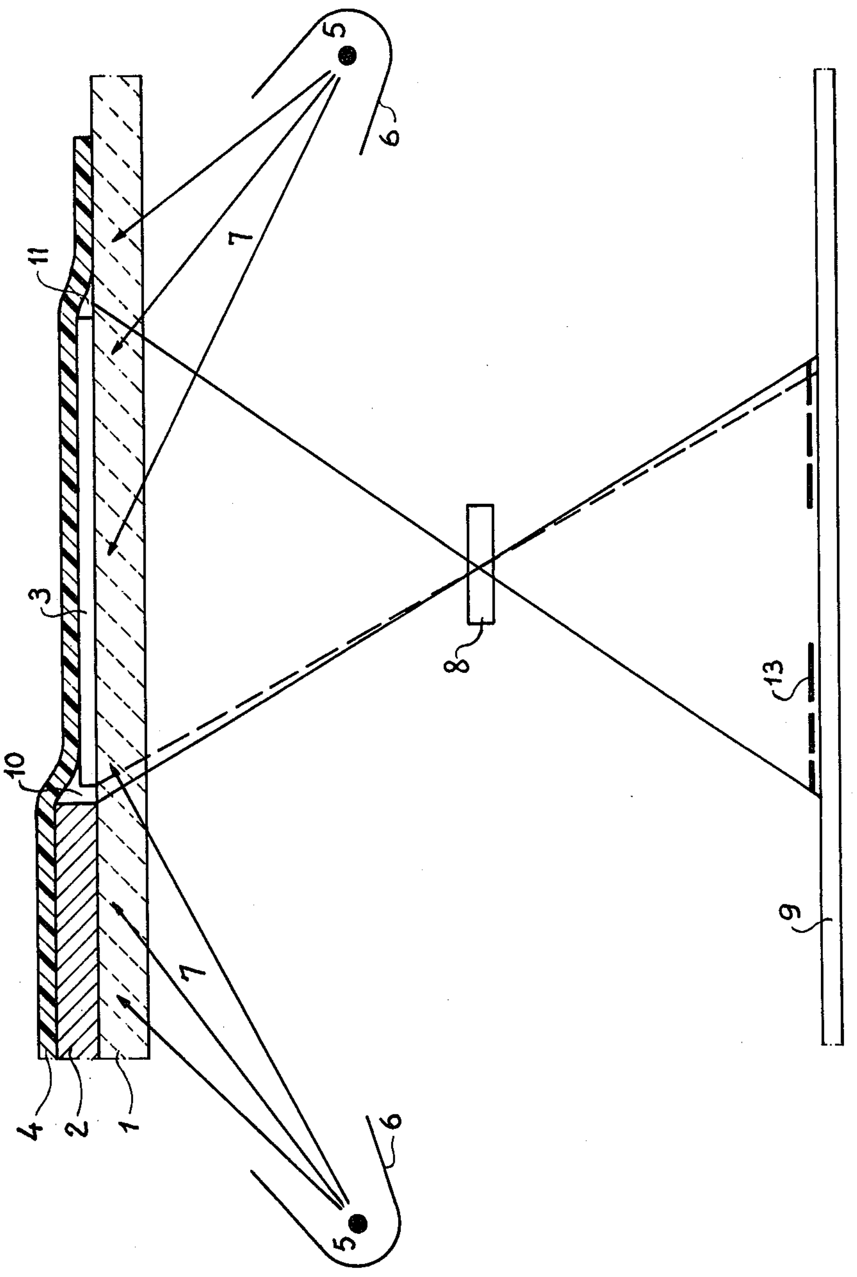
FIG. 1 is a schematic representation of the exposing of an original in a known electrophotographic copying apparatus.

FIG. 1 of the drawings illustrates the making of an exposure in a known electrophotographic copying apparatus in which an original 3 is lying on a glass exposure plate 1 beneath a covering flap 4, with one edge of the original adjacent to a guide member 2. Even though the original has been shoved closely against the guide 2, a small slit 10 (nearly) always is present between the two. Also, a cavity 11 nearly always is present between the opposite edge of the original and a portion of the under surface of the flap 4.

The original is exposed by illumination from light sources 5 provided with reflectors 6. The light image resulting is projected via a lens system 8 onto a precharged photoconductive material, which in the situation illustrated is negatively charged and may be, for instance, a portion of a photoconductive belt 9. The photoconductive surface areas struck by the light lose their charge, while in the other areas the charge is maintained so that a developable, electrostatic latent image 13 is thus produced. It is evident from the directions of the exposing light rays, as represented by lines 7, that the light penetrates little or hardly at all into the slit 10, which becomes a cavity when the flap 4 is lying over it. Consequently, the charge is not exposed away on the part of the photoconductive surface corresponding with the slit 10, and this part will attract colored toner particles during the development of the latent image, thus resulting in a more or less broad stripe on the copy produced. Under certain circumstances, for instance when copying from thick originals such as books, the cavity 11 will also give rise to the formation of a stripe on the copy.

Figure 2:
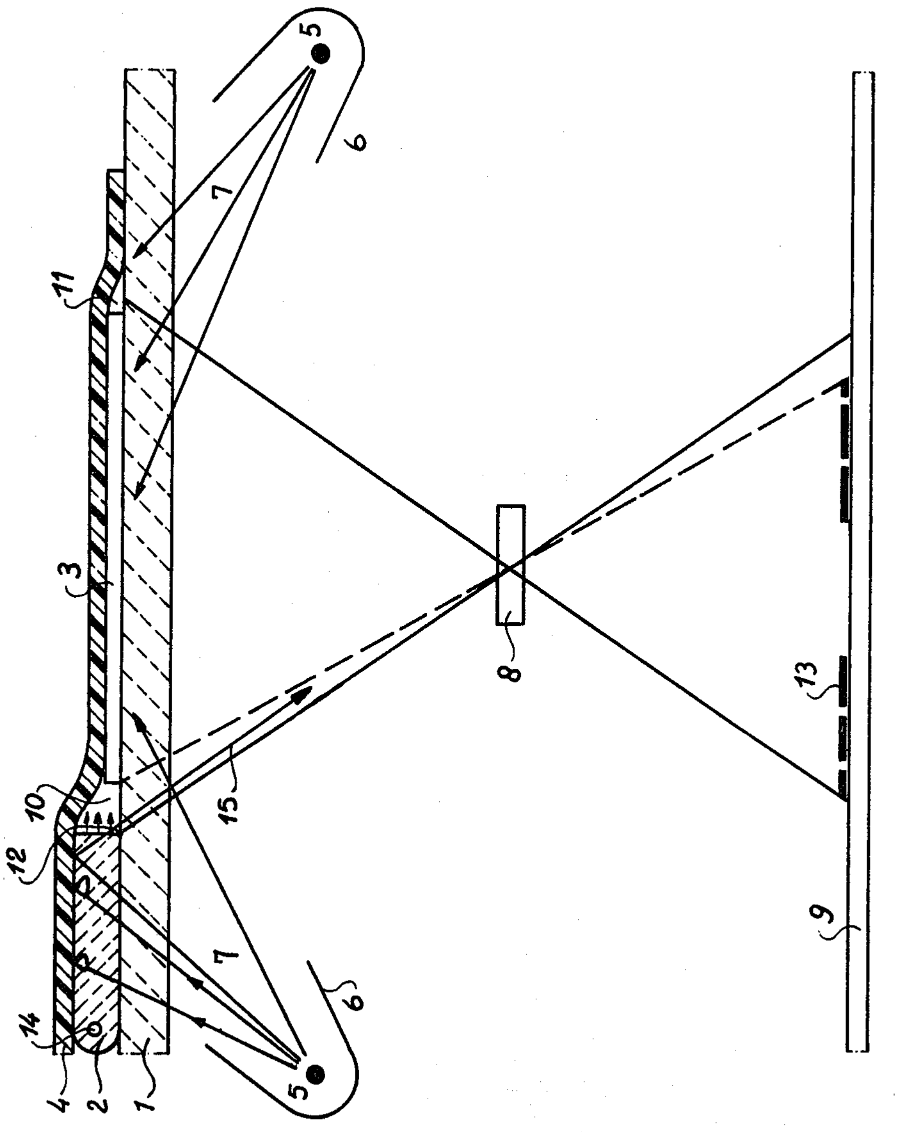
FIG. 2 is a schematic representation of an embodiment of the present invention.

In the embodiment of the invention as illustrated in FIG. 2, the exposure station of the electrophotographic copying apparatus is similar to that described in reference to FIG. 1, excepting that now, at the location where a narrow slit 10 usually is left between a side edge of the original 3 and an edge guide member located on the glass plate 1, the edge guide member is provided as a transparent plate **2*a* which is made of a transparent material such as glass or a transparent plastic, e.g., Perspex, and has all its surfaces made diffusely reflecting except the lower surface and the side edge surface, directed respectively towards the glass plate 1 and the original 3. Consequently, contrary to the usual condition illustrated by FIG. 1, upon the original being exposed to light from the light sources 5 and the reflectors 6, the rays 7 emitted by a light source 5 to the transparent guide plate 2*a* can enter into this plate through its (lower) surface lying next to the glass plate 1. Since all surfaces of the transparent guide plate, except its lower surface directed toward plate 1 and its side or raised edge directed toward the original 3, are diffusely reflecting, the light which enters the guide plate 2*a* via its lower surface can leave the plate only in two ways, namely, via that surface or via the side edge surface in the direction toward the nearby side edge of original 3, as indicated by the small arrows in FIG. 2. The light coming out of the transparent side edge surface of the guide plate effects an (extra) exposure of the slit or cavity 10 and results in reflections from it represented schematically by the arrow 15. Consequently, the charge on the surface portion of the photoconductive belt 9 corresponding with the slit 10** is exposed away, or substantially exposed away, so that this portion will not, or will hardly, accept any toner particles upon development of the latent image.

Since a member for guiding the laying of originals on a glass exposure plate is usually mounted firmly on or over the glass plate, there may be a risk in the course of time, in the use of the embodiment shown in FIG. 2, that a (black) stripe will again appear on the copies produced, as a result of dirt having accumulated in the corner 12 bordered by the side edge of the guide plate **2*a* and the glass plate 1. Thus there may be a recurrence of the shortcoming otherwise remedied by the transparent guide plate, unless the corner 12 is kept clean. Cleaning out the corner, however, is difficult, and for thoroughly cleaning it the use of a sharp object is needed, with a risk of scratching the glass plate and the transparent surface of the guide plate. This difficulty, however, can be avoided without trouble according to the invention by fixing the transparent guide plate 2*a* in place over the glass plate on a shaft 14 so that the guide plate can be rotated upwardly about the axis of this shaft. Consequently, when dirt accumulates in the corner 12 the guide plate 2*a* can be lifted out of its normal position to a position in which the glass plate and subsequently the lower corner edge of the guide plate can be cleaned very easily, for instance with a pad soaked in a solvent. It is preferable in this regard that the transparent guide plate be made rotatable about an axis adjacent to its longitudinal side edge disposed away from the original, and that side edge preferably is rounded concentrically with the shaft 14** as shown.

The method and means according to this invention are especially advantageous for copying according to the electrophotographic process, but they are also useful for any manner of copying in which the original is exposed episcopically.

Figure 3:
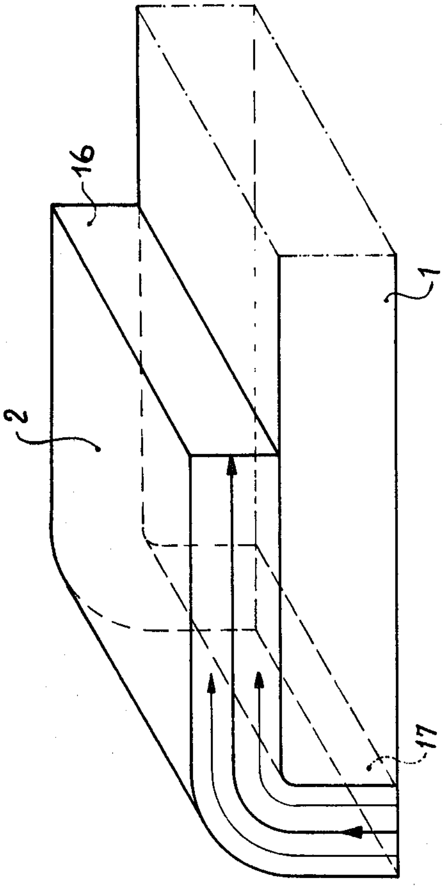
FIG. 3 is a schematic view of a modification of a transparent guide plate provided on a transparent exposure plate according to the invention.

FIG. 3 of the drawings shows schematically a modified form of a transparent guide plate which is suitable for use according to the invention in place of the guide plate **2*a* of FIG. 2. In this embodiment the transparent guide plate 2*b* has the form of a substantially L-shaped plate of rectangular cross section which is fitted onto an edge-corner portion of the glass exposure plate 1. The portion of plate 2*b* overlying the side edge of the glass plate 1 has at its end edge a rectangular lower surface 17 lying in the path of illumination from a light source such as one of the lamps 5 in FIG. 2. The portion lying on and along a margin of plate 1 has a rectangular side edge surface 16 directed toward and for guiding an edge of an original laid on the glass plate 1. The rectangular surfaces 16 and 17 are kept transparent, while all other surfaces of the plate 2*b*** are made diffusely reflecting.

Light from the light source below the glass plate 1 enters into the guide plate **2*b* via the lower surface 17 and passes through this plate in a bent path as indicated by the arrows in FIG. 3, thus being directed through the transparent side surface 16** so as to effect an extra exposure of the slit or cavity existing between an edge of the original and the adjacent edge of the guide plate.

The present invention can be carried out in many ways other than those represented by the embodiments illustrated in the drawings or described above. It is also apparent that the quantity of light required for the extra exposure can be obtained from a light source separate from the light sources principally used for the copying.

What is claimed is:

1. A method for preventing edge shadow effects upon episcopic exposure of an original lying underneath a platen cover on a transparent exposure plate, which comprises during such exposure passing light through a light transmitting member at least a portion of which is disposed on said plate underneath said cover in the plane of the original and directing light transmitted by said member onto a side edge of the original from an edge of said member confronting said side edge.

2. A method according to claim 1, said light transmitting member comprising a transparent plate member having a transparent surface disposed in a path of illumination from a light source and a transparent edge surface directed toward a side edge of the original, the other surfaces of said plate member being diffusely reflecting surfaces.

3. A method according to claim 2, said transparent plate member extending along a margin of said exposure plate with said edge surface directed toward the original positioned to guide the laying of the original onto said exposure plate.

4. In an electrophotographic copying apparatus including a transparent exposure plate, a platen cover, means for illuminating through said plate an original lying thereon underneath said cover and means for projecting a resulting reflected light image onto a photoconductive medium to form a developable latent image, the improvement which comprises means including a light transmitting member at least a portion of which is disposed on said plate underneath said cover in the plane of the original and has a light pervious surface confronting a side edge of said original for directing light transmitted by said member onto said edge and thereby preventing edge shadow effects during exposure of the original.

5. Apparatus according to claim 4, said light transmitting member comprising a transparent plate member is disposed laterally adjacent to a side edge of the original and having a transparent surface in a path of illumination from a light source and a transparent surface directed toward a side edge of the original, the other surfaces of said plate member being diffusely reflecting surfaces.

6. Apparatus according to claim 4, said light transmitting member comprising a transparent plate member extending along a margin of said exposure plate in position to guide the laying of an original onto said exposure plate, said plate member having a transparent side edge surface directed toward a side edge of the original and a transparent lower surface disposed in a path of illumination during exposure of the original, the other surfaces of said plate member being diffusely reflecting surfaces.

7. Apparatus according to claim 6, said transparent plate member being mounted for turning movement away from said exposure plate about an axis along a side edge of said plate member away from said transparent side edge surface.

8. Apparatus according to claim 6, said transparent plate member being substantially L-shaped and being fitted onto said exposure plate over an edge corner thereof, the respective end edge surfaces of the L forming portions of said plate member being said transparent surfaces.

* * * * *